United States Patent [19]

Bäbler

[11] Patent Number: 5,063,258

[45] Date of Patent: Nov. 5, 1991

[54] COATING COMPOSITIONS CONTAINING MOLYBDENUM DISULFIDE

[75] Inventor: Fridolin Bäbler, Marly, Switzerland

[73] Assignee: Ciba-Geigy Corporation, Ardsley, N.Y.

[21] Appl. No.: 403,248

[22] Filed: Sep. 5, 1989

[30] Foreign Application Priority Data

Sep. 9, 1988 [CH] Switzerland .......... 3372/88

[51] Int. Cl.$^5$ .............................. C08K 3/30
[52] U.S. Cl. .................. 523/171; 523/200; 523/442; 523/458; 523/513; 523/515; 524/406
[58] Field of Search .......... 523/171, 442, 458, 200, 523/513, 515; 524/406

[56] References Cited

U.S. PATENT DOCUMENTS

| | | | |
|---|---|---|---|
| 2,945,770 | 7/1960 | Suchow | 524/406 |
| 4,003,867 | 1/1977 | Cooper et al. | 523/513 |
| 4,081,423 | 8/1978 | Hardenfelt | 260/40 R |
| 4,517,320 | 5/1985 | Babler et al. | 523/215 |
| 4,605,687 | 8/1986 | Panush | 523/171 |
| 4,701,382 | 10/1987 | Pichaut | 428/457 |
| 4,780,140 | 10/1988 | Franz et al. | 106/20 |

OTHER PUBLICATIONS

Chem. Abstracts, 91, No. 26, 212342s (1979).
Chem. Abstracts, 103, No. 20, 161940s (1985).

*Primary Examiner*—Lewis T. Jacobs
*Attorney, Agent, or Firm*—Harry Falber

[57] ABSTRACT

Coating compositions which do not contain metal powders and which contain, as coloring component, 0.001 to 30% by weight of at least one organic pigment and/or of a polymer-soluble dye and/or of a pearlescent pigment and 0.001 to 30% by weight of molybdenum disulfide, based on the coating produced therewith, are suitable, for example, for coloring surfaces, especially metal surfaces.

18 Claims, No Drawings

COATING COMPOSITIONS CONTAINING MOLYBDENUM DISULFIDE

The present invention relates to coating compositions containing molybdenum disulfide and to the use thereof for colouring surfaces, in particular metal surfaces.

It is common knowledge that metallic surfaces are often coated with coating compositions which contain metal powders of specific grain size to produce special effects such as metallic effects, especially in the field of automotive applications. Thus, for example, U.S. Pat. No. 4,081,423 teaches the use of decorative coating compositions containing an organic binder, a metal powder of specific grain size such as copper, bronze, iron, tin, zinc and noble metals, and a specific amount of graphite to produce a metallic effect. Further, European patent application 0 268 072 teaches the use of iron oxide pigments in platelet form as effect pigments, for example in lacquers.

It is further known from U.S. Pat. No. 4,517,320 to produce stoving finishes with a metallic effect without the concomitant use of metal particles by using paint which contain, as colouring component, a combination of a specific amount of graphite with at least one organic pigment or polymer-soluble dye. Although it is thereby possible to produce novel shades with metallic effects, these shades are somewhat dark on account of the grey-black inherent colour of the graphite.

In addition, it is known to use molybdenum disulfide as lubricant in liquid coating compositions (q.v. for example European patent application 0 156 437) or as pearlescent pigment (q.v. U.S. Pat. No. 2,945,770) to produce dark blue nacre effects in specific coating lacquers. With such compositions, however, it is only possible to produce dark blue to black coatings.

It has now been found that it is possible to produce coating compositions having a metallic effect without the concomitant use of metal powders by using, as colouring component, a specific amount of molybdenum disulfide in conjunction with at least one organic pigment and/or a polymer-soluble organic dye and/or a pearlescent pigment. The very pure metallic effect coatings thereby obtained are markedly brighter in shade than those obtained with the analogous compositions containing graphite, so that the coating compositions of this invention open up new styling possibilities for the cosmetics, and especially for the automobile, industry. In addition, smaller amounts of organic pigment or polymer-soluble dye are required with molybdenum disulfide than with graphite, thereby often producing a favourable effect on the rheological properties of the coating compositions prepared with molybdenum disulfide.

Accordingly, the present invention relates to coating compositions for producing a metal effect finish without the concomitant use of metal powders, which compositions contain, as colouring component, 0.001 to 30% by weight of at least one organic pigment and/or polymer-soluble organic dye and/or pearlescent pigment, and 0.001 to 30% by weight of molybdenum disulfide, based on the weight of the dry coating produced therewith.

Examples of suitable coating compositions are heat-curable coatings, air drying or physically drying coatings or cross-linking chemically reactive coatings, especially stoving finishes which contain the customary binders which are reactive at high temperature, for example those selected from the group consisting of acrylic, alkyd, epoxy, phenolic, melamine, urea, polyester, polyurethane, blocked isocyanate, benzoguanamine or cellulose ester resins, or combinations thereof. Suitable air drying or physically drying coatings are in particular the conventional lacquers used especially in the cosmetics industry, for example for the preparation of nail varnishes, and known to the skilled person, for example nitrocellulose lacquers.

It is preferred to use the coatings conventionally employed in the automobile industry, especially acrylic/melamine resin, alkyd/melamine resin or thermoplastic acrylic resin systems, as well as in particular aqueous coating systems.

The dry coatings obtained with the coating compositions of this invention preferably have a thickness of 3–60 $\mu$m, more particularly 7 to 25 $\mu$m, and are normally monolayer finishes.

The coating can be provided with one or more layers of clear coating. The heat-curable acrylic/melamine resin combinations known in the field of automotive coatings are preferably used as binders of the clear coatings. The thickness of the dry clear coating film is preferably 30 to 60 $\mu$m.

The molybdenum disulfide is suitably in particular molybdenum disulfide in flake or platelet form with a particle diameter of less than 100 $\mu$m and a thickness of up to 4 $\mu$m.

The optimun metallic effects can be determined by varying the concentration of molybdenum disulfide within the indicated range. It is preferred to use 1.0 to 15.0% by weight of molybdenum disulfide, based on the dry coating.

It is particularly suitable to use molybdenum disulfide in flake or platelet form and in which 60–95% by weight of the particles have an average size of 1–12 $\mu$m. Conveniently the particles have a size of 0.1 to 24 $\mu$m.

Examples of organic pigments are: azo, azomethine, methine, anthraquinone, phthalocyanine, perinone, perylene, dioxazine, diketopyrrolopyrrole, thioindigo, iminoisoindoline, iminoisoindolinone, quinacridone, quinacridonequinone, flavanthrone, indanthrone, anthrapyrimidine or quinophthalone pigments, and also metal complexes of, for example, azo, azomethine or methine dyes. Particularly preferred pigments are those suitable for the preparation of automotive coatings such as the different crystal modifications of copper phthalocyanine, indanthrone blue, $\beta$- and $\gamma$-quinacridones, C.I. Pigment Red 177, Red 179, Red 224, Red 254 and Red 255, C.I. Pigment Yellow 24, Yellow 109, Yellow 110, Yellow 128, Yellow 129, Yellow 177 and Yellow 179, as well as C.I. Pigment Orange 48, Orange 49, Orange 61, Orange 65 and Orange 66.

Examples of suitable polymer-soluble organic dyes are phthalocyanine dyes or metal complexes of azo dyes, preferably 1:2 chromium or cobalt complexes of monoazo dyes, and also fluorescent dyes such as those of the coumarin, naphthalimide, pyrazoline, acridine, xanthene, thioxanthene, oxazine, thiazine or benzthiazole series. Metal complexes of azo dyes are preferred.

In addition to containing the molybdenum disulfide, the composition of this invention preferably contain only one organic pigment or only one polymer-soluble organic dye, but more particularly only one organic pigment, most preferably a transparent organic pigment.

Examples of pearlescent pigments are natural and synthetic pearlescent pigments such as the silvery-white pearlescent pigments, for example the so-called natural "fish scale" pigments or, as synthetic pearlescent pigments, basic lead carbonate, bismuth oxychloride, bismuth oxychloride on carrier and, in particular, the titanium dioxide-coated mica pigments, which last mentioned pigments may also contain other coloured metal oxides such as iron oxide, cobalt oxide, manganese oxide or chromium oxide.

The coating compositions of this invention contain the organic pigment and/or the polymer-soluble dye and/or the pearlescent pigment preferably in amounts of 1.0 to 10.0% by weight, based on the dry coating.

Starting from commercially available molybdenum disulfide, the molybdenum disulfide used in the composition of this invention is obtained in the preferred state in known manner, for example by grinding in air jet, sand or ball mills. Substantially planar molybdenum disulfide particles in platelet or flake form are obtained, for example by wet grinding coarse crystalline molybdenum disulfide in a grinding apparatus which contains metal, glass or porcelain balls, plastic granules or sand grains as grinding elements. The grinding elements are set in motion, for example, by rotating the apparatus or by a vibration exciter or a stirrer.

It can be advantageous to treat the pigment and/or the polymer-soluble dye and/or the pearlescent pigment and/or the molybdenum disulfide, before use in the composition of this invention, with a texture improver. It is preferred to use a molybdenum disulfide which has been treated with a texture improver, for example before or after the treatment or grinding. It is preferred to use 0.02 to 25% by weight of a texture improver, based on the amount of molybdenum disulfide used.

Examples of suitable texture improvers are fatty acids of at least 12 carbon atoms such as stearic acid or behenic acid, or amides, salts or esters thereof, such as magnesium stearate, zinc stearate, aluminium stearate or magnesium behenate, and also quaternary ammonium compounds such as tri($C_1$–$C_4$)alkylbenzylammonium salts; and also plasticisers such as epoxidised soya bean oil, waxes such as polyethylene wax, resinic acids such as abietic acid, rosin soap, hydrogenated or dimerised colophonium. $C_{12}$–$C_{18}$alkanedisulfonic acids, alkylphenols, alcohols, diols or polyols containing not less than 5 carbon atoms.

The compositions of this invention preferably contain molybdenum disulfide which has been teated with stearic acid, stearylamine, hydrogenated abietic acid, epoxidised soya bean oil or a 1,2-diol, preferably with 1,2-hexanediol, 1,2-octanediol or 1,2-dodecanediol.

To produce the coatings, molybdenum disulfide and organic pigment, polymer-soluble dye or pearlescent pigment, individually or premixed, can be dispersed by known methods in the binder. Additional non-volatile modifiers can also be added, for example plasticisers, auxiliaries, fillers, light stabilisers, heat stabilisers, antioxidants and inorganic pigments such as $TiO_2$. The homogenised composition can be applied by, for example, brushing, roller coating, spraying, dipping or coil coating to the substrate and dried or stoved.

A layer of clear coating can also be prepared by known methods and may also contain modifiers such as light stabilisers and antioxidants.

Examples of suitable substrates are wood, paper, ceramics, glass, plastics materials and, in particular, metal surfaces, as well as cosmetic substrates such as nails.

The presence of the fine crystalline molybdenum disulfide particles in flake or platelet form in the coatings of this invention produces a metallic effect with a fine, bright, level lustrous gloss. The metallic effect is especially marked when the coating is irradiated by direct light from an artificial light source or by sunlight. The light is partially reflected by the molybdenum particles present in the lacquer to produce a clearly perceptible sheen. This special lustre effect can be measured, for example, by a goniophotometer.

The use of molybdenum disulfide in the practice of this invention is economic. The heat resistance, lightfastness and fastness to weathering of molybdenum disulfide itself and of the coatings obtained are excellent. Furthermore, molybdenum disulfide can be very readily incorporated into the organic material and causes only insignificant wear of the processing apparatus empoyed and a slight braking effect. In particular, level colorations of optically interesting properties are obtained.

The metallic effect coatings of this invention are mainly intended for production on metal surfaces, especially in the automobile industry (car finishes), where metallic effects are obtained without the concomitant use of metal powders such as aluminium or copper powder. This is especially important for aqueous coating systems in which the metal powders such as aluminium powder are known to be unstable (hydrolysis).

In the following Examples parts are by weight, unless otherwise indicated.

EXAMPLE 1

In a 500 ml glass bead mill, 15.5 g of molybdenum (IV) sulfide (ex Fluka AG) having a particle size smaller than 350 μm and 0.5 g of 1,2-octanediol are stirred in 120 ml of water. To the suspension are added 400 g of glass balls having a diameter of 3.5–4.0 mm and the mixture is ground for 9 hours at a temperature of ca. 20° C. and at a stirring rate of 320 rpm. The speed of the metal propeller mixer (5.5 cm diameter) is 0.92 m/sec. The molybdenum disulfide suspension is separated from the glass balls and then washed with a small amount of water and filtered. The filter residue is washed with cold water and dried at 70°–80° C. in a vacuum drier, affording 15.2 g of a grey molybdenum disulfide which, when pulverised, can be readily incorporated in automotive laquers which are then stoved. Scanning electron photomicrographs of the conditioned molybdenum disulfide show particles of marked flake-like to platelet appearance. A particle size determination made with a granulometer of type 715E 598, supplied by CILAS, Marcoussis/FR, shows that 85% of the particles have a size of 6 to 24 μm and a median size of 9.6 μm.

EXAMPLE 2

3 g of the molybdenum disulfide obtained according to Example 1 and 3 g of copper phthalocyanine pigment, C.I. Pigment Blue 15:3, are stirred into 20 g of a mixture of the following composition: 50 g of Solvesso 150 ® (mixture of aromatic hydrocarbons, ESSO), 15 g of butylacetate, 5 g of Exkin II ® (ketoxime-based levelling agent), 25 g of methyl isobutyl ketone and 5 g of silicone oil (1% in Solvesso 150 ®). After complete dispersion has been attained, 48.3 g of Baycryl L 530 ® (acrylic resin; 51% in xylene/butanol 3:1) and 23.7 g of Maprenal TTX ® (melamine resin; 55% in butanol) are added. The batch is briefly homogenised and the resultant coating composition is then sprayed on to a metal sheet and stoved for 30 minutes at 130° C. The finish so obtained has a lustrous blue metallic shade of excellent fastness properties. The lacquer is distinguished by very good flow properties and excellent dispersion of the pigments.

EXAMPLE 3

The following ingredients are thoroughly mixed for 96 hours in a ball mill:
- 25.2 g of Dynapol H 700® (polyester resin, 60% in Solvesso 150®, ex Dynamit Nobel),
- 2.7 g of Maprenal MF 650® (melamine resin, 55% in butanol, ex Hoechst),
- 15.5 g of cellulose acetobutyrate 531.1® (25% in xylene/butyl acetate 1:2, ex Eastman Chemical International),
- 1.1 g Irgarol TZ6® (catalyst based on mineral oil/-carboxylate, ex Ciba-Geigy AG),
- 23.3 g of butyl acetate,
- 11.6 g of xylene,
- 11.6 g of Solvesso 150® (ESSO),
- 4.5 g of C.I. Pigment Red 177 and
- 4.5 g of the molybdenum disulfide obtained according to Example 1, are thoroughly stirred in a ball mill for 96 hours, the pigment and the molybdenum disulfide being finely dispersed in the lacquer vehicle. The coating composition is then diluted with the above butyl acetate/xylene/Solvesso 150® solvent mixture to a viscosity of ca. 18 seconds (20° C.) according to DIN 4 and subsequently applied to a metal sheet. After brief exposure to air (2 minutes at ca. 40° C.), this pigmented primer coating is provided with an unpigmented top coat comprising
- 58.3 g of Viacryl VC 373® (acrylic resin, 60% in xylene, ex Vianora),
- 27.3 g of Maprenal MF 590® (melamine resin, 55% in butanol, ex Hoechst),
- 1.0 g of silicone oil A® (1% in xylene, ex Bayer),
- 1.0 g of Tinuvin 900® (benzotriazole derivative, ex Ciba-Geigy AG),
- 5.4 g of xylene,
- 4.0 g of Solvesso 150® (ESSO), and
- 3.0 g of ethylene glycol acetate exposed to air for 30 minutes at 40° C. and then stoved for 30 minutes at 135° C.

The lustrous red metallic coating so obtained has excellent fastness properties. It has high gloss and excellent distribution of the colorants. Exposure of the coating to light from an artificial light source or to sunlight produces a distinct glitter effect which is caused by the molybdenum disulfide particles present in the lacquer.

EXAMPLE 4

The procedure described in Example 2 is repeated, replacing copper phthalocyanine by the disazo condensation pigment, C.I. Pigment Yellow 128, to give a level lustrous greenish yellow metallic coating of comparably good fastness properties.

EXAMPLE 5

The procedure described in Example 2 is repeated, replacing copper phthalocyanine by the dioxazine pigment, C.I. Pigment Violet 37, to give a level, lustrous bluish-violet metallic coating of comparably good fastness properties.

EXAMPLE 6

The procedure described in Example 2 is repeated, replacing cooper phthalocyanine by the perylene pigment, PALIOGEN Red 4120® (BASF, C.I. Pigment Red 149), to give a lustrous, brownish red metallic coating of excellent fastness to heat, light and weathering.

EXAMPLE 7

The procedure of Example 3 is repeated, replacing C.I. Pigment Red 177 by C.I. Pigment Blue 60, to give a level, lustrous, blue metallic coating of comparably good fastness properties.

EXAMPLE 8

The procedure of Example 7 is repeated, replacing 4.5 g of C.I. Pigment Blue by 2.0 g of 3-methoxypropyl copper phthalocyaninetetrasulfonamide, to give a level, lustrous, blue metallic coating of comparably good fastness properties.

EXAMPLE 9

The procedure of Example 3 is repeated, replacing C.I. Pigment Red 177 by C.I. Pigment Green 7, to give a level, lustrous, violet metallic coating of comparably good fastness properties.

EXAMPLE 10

The procedure of Example 3 is repeated, replacing C.I. Pigment Red 177 by C.I. Pigment Green 7, to give a level, strong, lustrous, metallic green coating of comparably good fastness properties.

EXAMPLE 11

The procedure of Example 4 is repeated, replacing C.I. Pigment Yellow 128 by a transparent form of the diketopyrrolopyrrole pigment, C.I. Pigment Red 255, to give a level, strong, lustrous, red metallic coating of comparably good fastness properties.

EXAMPLE 12

The procedure of Example 2 is repeated, replacing copper phthalocyanine by a solid pigment solution according to Example 1 of U.S. Pat. No. 4,810,304 and using 2.0 g instead of 3.0 g of molybdenum(IV) sulfide, to give a level, lustrous bluish-red metallic coating of comparably good fastness properties.

EXAMPLE 13

The procedure of Example 2 is repeated, using the copper phthalocyanine/molybdenum(IV) sulfide mixture described therein and replacing the solvent-containing acrylic resin/melamine resin lacquer system by a commercially available aqueous acrylic resin/melamine resin lacquer system. The coating composition so obtained is applied by a method known to the skilled person to give a level, lustrous, blue metallic coating of comparably good fastness properties.

EXAMPLE 14

The procedure of Example 3 is repeated, using 1.0 g instead of 4.5 g of the molybdenum disulfide pigment in platelet form and replacing C.I. Pigment Red 177 by the pearlescent pigment, IRIODIN Ti-100® (MERCK), to give a level, lustrous metallic coating.

EXAMPLE 15

The procedure of Example 2 is repeated, replacing the molybdenum disulfide pigment having an average particle size of 9.6 μm by a molybdenum disulfide pigment in platelet from having an average particle size of 4 μm measured by granulometry, to give a lustrous, blue metallic coating of excellent gloss.

EXAMPLE 16

A mixture of 0.1 g of a pearlescent $TiO_2$-mica pigment (IRIODIN Ti-100®, ex Merck), 0.1 g of the molybdenum disulfide pigment obtained according to Example 1, 2.5 g of FDA D+A Red 7 (colorant for nail varnish), 10.0 g of nitrocellulose, 10.0 g of ricinoalkyd resin (ALKYDAL RU 50A® (ex Bayer AG), 5 g of acetyl tributyl citrate, 20 ml of ethyl acetate, 43 ml of butyl acetate, 6 ml of isopropyl alcohol and 2.5 g of an organically modified bentonite is homogenised by conventional methods to a nail varnish which produces a violet silky lustre finish.

What is claimed is:

1. A coating composition for producing a metal effect coating without the concomitant use of metal powders, which composition comprises, as coloring component, 0.001 to 30% by weight of an organic pigment and 0.001 to 30% by weight of molybdenum disulfide, based on the weight of the dry coating produced therewith, the molybdenum disulfide being in flake or platelet form having a particle diameter of less than 100 μm and a thickness of up to 4 μm.

2. A coating composition according to claim 1 which is a stoving finish selected from the group consisting of acrylic, epoxy, phenolic, melamine, urea, polyester, polyurethane, benzoguanamine and cellulose ester resins, and combinations thereof.

3. A coating composition according to claim 1, wherein 60–95% by weight of the particles of the molybdenum disulfide in flake or platelet form have an average size of 1 to 12 μm.

4. A coating composition according to claim 1, wherein the concentration of molybdenum disulfide is 1.0 to 15.0% by weight, based on the dry coating.

5. A coating composition according to claim 1, wherein the organic pigment is selected from the group consisting of azo, azomethine, methine, anthraquinone, phthalocyanine, perinone, perylene, dioxazine, diketopyrrolopyrrole, thioindigo, iminoisoindoline, iminoisoindolinone, quinacridone, quinacridonequinone, flavanthrone, indanthrone, anthrapyrimidine and quinophthalone pigments, and metal complexes of azo, azomethine and methine dyes.

6. A coating composition according to claim 1, wherein a transparent organic pigment is used in addition to the molybdenum disulfide.

7. A coating composition according to claim 1, which contains 0.1 to 10.0% by weight of organic pigment, based on the dry coating.

8. A coating composition according to claim 1, wherein the organic pigment is a pigment suitable for the preparation of automotive coatings.

9. A coating composition for producing a metal effect coating without the concomitant use of metal powders, which composition comprises, as coloring component, 0.001 to 30% by weight of a polymer-soluble organic dye and 0.001 to 30% by weight of molybdenum disulfide, based on the weight of the dry coating produced therewith.

10. A coating composition according to claim 1, wherein the molybdenum disulfide is treated with stearic acid, stearylamine, hydrogenated abietic acid, epoxidised soya bean oil or with an aliphatic 1,2-diol.

11. A coating composition according to claim 1 which is an acrylic/melamine resin, alkyd/melamine resin or a thermoplastic acrylic resin system or an aqueous coating system.

12. A coating composition according to claim 11 which is an aqueous coating system.

13. A coating composition according to claim 9, wherein the polymer-soluble dye is a 1:2 chromium or 1:2 cobalt complex of a monoazo dye.

14. A coating composition according to claim 13, wherein the molybdenum disulfide is in flake or platelet form having a particle diameter of less than 100 μm and a thickness of up to 4 μm.

15. A coating composition according to claim 13, which contains 0.1 to 10.0% by weight of polymer-soluble dye, based on the dry coating.

16. A coating composition for producing a metal effect coating without the concomitant use of metal powders, which composition comprises, as coloring component, 0.001 to 30% by weight of a non-molybdenum disulfide pearlescent pigment, and 0.001 to 30% by weight of molybdenum disulfide, based on the weight of the dry coating produced therewith.

17. A coating composition according to claim 16, wherein the molybdenum disulfide is in flake or platelet form having a particle diameter of less than 100 μm and a thickness of up to 4 μm.

18. A coating composition according to claim 16, which contains 0.1 to 10.0% by weight of non-molybdenum disulfide pearlescent pigment, based on the dry coating.

* * * * *